US009444720B2

(12) United States Patent
Allan et al.

(10) Patent No.: US 9,444,720 B2
(45) Date of Patent: Sep. 13, 2016

(54) METHOD AND APPARATUS FOR MULTICAST IMPLEMENTATION IN A ROUTED ETHERNET MESH NETWORK

(75) Inventors: David Allan, Ottawa (CA); Nigel Bragg, Weston Colville (GB); Jerome Chiabaut, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1105 days.

(21) Appl. No.: 12/435,973

(22) Filed: May 5, 2009

(65) Prior Publication Data

US 2010/0284309 A1 Nov. 11, 2010

(51) Int. Cl.
*H04L 12/701* (2013.01)
*H04L 12/721* (2013.01)
*H04L 12/761* (2013.01)
*H04L 12/18* (2006.01)
*H04L 12/46* (2006.01)

(52) U.S. Cl.
CPC ............ *H04L 45/00* (2013.01); *H04L 12/185* (2013.01); *H04L 45/12* (2013.01); *H04L 45/16* (2013.01); *H04L 45/66* (2013.01); *H04L 12/4641* (2013.01)

(58) Field of Classification Search
CPC ..... H04L 45/00; H04L 45/12; H04L 45/123; H04L 45/66; H04L 12/4641
See application file for complete search history.

(56) References Cited

U.S. PATENT DOCUMENTS

| 6,529,888 B1* | 3/2003 | Heckerman et al. ............ 706/45 |
| 6,650,626 B1* | 11/2003 | Cain .............................. 370/256 |
| 6,831,895 B1* | 12/2004 | Ji et al. .......................... 370/237 |
| 2006/0010249 A1* | 1/2006 | Sabesan et al. ............... 709/238 |
| 2007/0047465 A1* | 3/2007 | Kano ............................. 370/254 |
| 2007/0165657 A1* | 7/2007 | Smith et al. ................... 370/401 |

OTHER PUBLICATIONS

Partridge et al., "FIRE: Flexible Intra-AS Routing Environment", IEEE Journal on Selected Areas in Communications, vol. 19, No. 3, Mar. 2001.*

International Search Report and Written Opinion dated Sep. 2, 2010 for International Application No. PCT/CA2010/000625, International Filing Date: Apr. 21, 2010 consisting of 8-pages.
Craig Partridge et al., "FIRE: Flexible Intra-AS Routing Environment", IEEE Journal on Selected Areas in Communications, vol. 19, No. 3, Mar. 2001.
Dave Allan et al. "New innovations in Ethernet: Provider Link State Bridging" Nortel Technical Journal, Issue 6, Mar. 2008.
Nortel, "Introduction to Provider Link State Bridging" Nortel White Paper, 2008.
Supplementary European Search Report—EP10771924—Search Authority—The Hague—Apr. 13, 2014.
Allan D et al: "Provider link state bridging",IEEE Communications Magazine, IEEE Service Center, Piscataway, US, vol. 46, No. 9, Sep. 1, 2008, pp. 110-117, XP011234296, ISSN: 0163-6804.
Craig Partridge et al.: "FIRE: Flexible Intra-AS Routing Environment", IEEE Journal on Selected Areas in Communications, vol. 19, No. 3, Mar. 2001, XP001101018.

* cited by examiner

*Primary Examiner* — Andrew Chriss
*Assistant Examiner* — Salvador E Rivas
(74) *Attorney, Agent, or Firm* — Clements Bernard PLLC; Christopher L. Bernard; Lawrence A. Baratta, Jr.

(57) ABSTRACT

Interest in multicast group membership may be advertised via a routing system on an Ethernet network along with an indication of an algorithm to be used by the nodes on the network to calculate the distribution tree or trees for the multicast. Each node, upon receipt of the advertisement, will determine the algorithm that is to be used to produce the multicast tree and will use the algorithm to calculate whether it is on a path between nodes advertising common interest in the multicast. Example algorithms may include shortest path algorithms and spanning tree algorithms. This allows multicast membership to be managed via the routing control plane, while enabling spanning tree processes to be used to forward multicast traffic. Since spanning tree is able to install multicast state per service rather than per source per service, this reduces the amount of forwarding state required to implement multicasts on the routed Ethernet mesh network.

21 Claims, 3 Drawing Sheets

US 9,444,720 B2

METHOD AND APPARATUS FOR MULTICAST IMPLEMENTATION IN A ROUTED ETHERNET MESH NETWORK

TECHNICAL FIELD

The present invention relates to communication networks, and, more particularly, to a method and apparatus for specifying a computational algorithm to be used for multicast tree implementation within a routed Ethernet mesh network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Ethernet is one such well known networking protocol that has been defined by the Institute of Electrical and Electronics Engineers (IEEE) as standards 802.1 and 802.3.

A routing protocol such as Intermediate System to Intermediate System (IS-IS) may be run on an Ethernet network as described in application Ser. No. 11/537,775, filed Oct. 2, 2006, entitled "Provider Link State Bridging," (PLSB) the content of which is hereby incorporated herein by reference. In a link state protocol controlled Ethernet network, the bridges forming the mesh network exchange link state advertisements to enable each node to have a synchronized view of the network topology, rather than utilizing a learned network view at each node by using the Spanning Tree Protocol (STP) algorithm combined with transparent bridging. This is achieved via the well understood mechanism of a link state routing system. The bridges in the network have a synchronized view of the network topology, have knowledge of the requisite unicast and multicast connectivity, can compute shortest path connectivity between any pair of bridges in the network, and individually can populate their filtering databases (FDBs) according to the computed view of the network.

An attribute of Ethernet mesh solutions is that multiple forwarding topologies can be virtualized by being assigned a unique VLAN. As described in Ser. No. 11/537,775, when all nodes have computed their role in the synchronized view and populated their FDBs for a given topology, the network will have a loop-free unicast tree to any given bridge from the set of peer bridges; and a both congruent and loop-free point-to-multipoint (p2mp) multicast tree from any given bridge to the same set of peer bridges.

To implement multicast connectivity, nodes on the network advertise interest in multicast service instances. Any node on the shortest path between two nodes advertising common interest in a particular multicast will install forwarding state in the node's filtering database (FDB) for the multicast, so that packet traffic received (directly or indirectly) from any node can be properly forwarded toward the destination node. Although this multicast solution works well, it requires forwarding state to be installed for each multicast source, group pair (S,G). As the number of multicast instances on the network increases, this may require the nodes to install significant forwarding state. Thus, it would be advantageous to allow a routed Ethernet mesh network to be able to utilize less state-intensive tree constructs, with simpler computation requirements, and potentially gain additional mechanisms for the distribution of load on the available network resources.

SUMMARY

Interest in multicast group membership may be advertised via a routing system on an Ethernet network along with an indication of an algorithm to be used by the nodes on the network to calculate the distribution tree or trees for both the multicast and congruent unicast forwarding. Each node, upon receipt of the advertisement, will determine the algorithm that is to be used to produce the multicast tree and will use the algorithm to calculate whether it is on a forwarding path between nodes advertising common interest in the multicast. Example algorithms may include shortest path algorithms and spanning tree algorithms. This allows multicast membership to be managed via the routing control plane, while enabling spanning tree processes to be used to forward multicast traffic. Since spanning tree is able to implement multicast using MAC state per service rather than per source per service, this reduces the amount of forwarding state required to implement multicasts on the routed Ethernet mesh network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
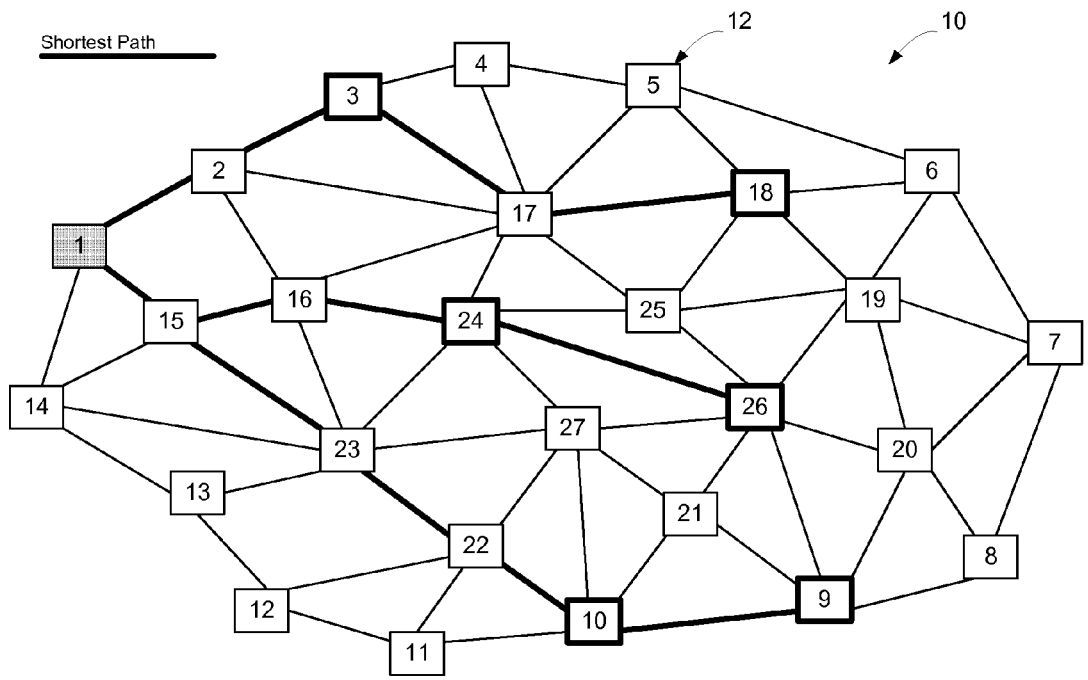
FIGS. 1-2 are functional block diagrams of a communication network showing establishment of shortest path multicast trees.
Figure 2:
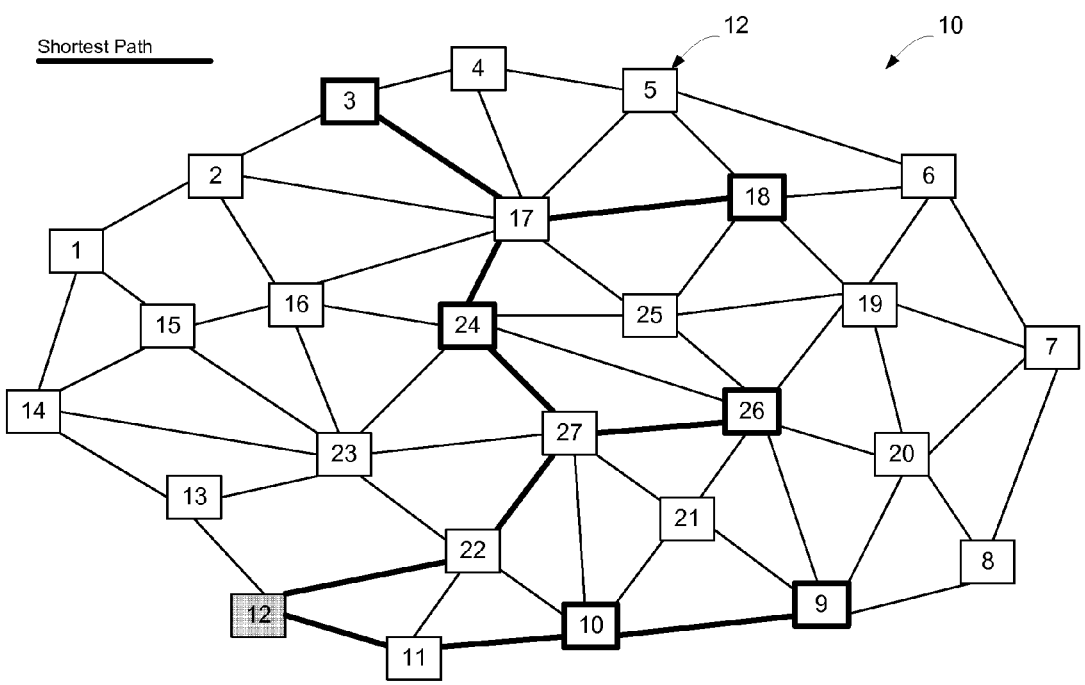

FIGS. 1-2 show an example communication network 10 in which two different source nodes 1, 12 are transmitting multicast data to the same set of destination nodes. In FIGS. 1-2, the multicast trees are established using shortest path forwarding. Accordingly, in FIG. 1, the nodes on the routed Ethernet mesh network have installed forwarding state to implement a shortest path tree for the multicast from source node 1 to destination nodes 3, 9, 10, 18, 24, and 26. Likewise, in FIG. 2, the nodes have installed forwarding state to implement a shortest path tree for the multicast from source node 12 to destination nodes 3, 9, 10, 18, 24, and 26. As is clear from a comparison of these two figures, the shortest path tree from different source nodes to the same set of destination nodes is likely, in general, to be different. Hence, the nodes on the network are required to implement forwarding state for each multicast based on both the source node and the set of destination nodes. Stated differently, each node on a shortest path for one of the shortest path trees will need to install state for the source, group (S,G) to implement the shortest path trees on the network.

Figure 3:
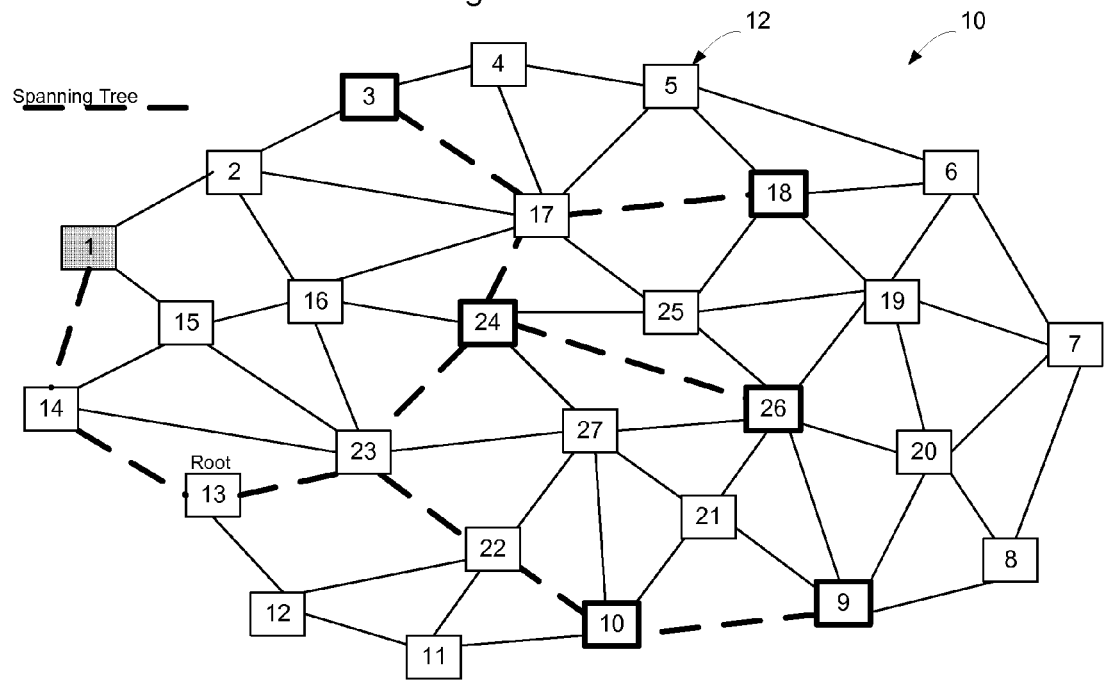
FIGS. 3-4 are functional block diagrams of a communication network showing establishment of spanning multicast trees.
Figure 4:
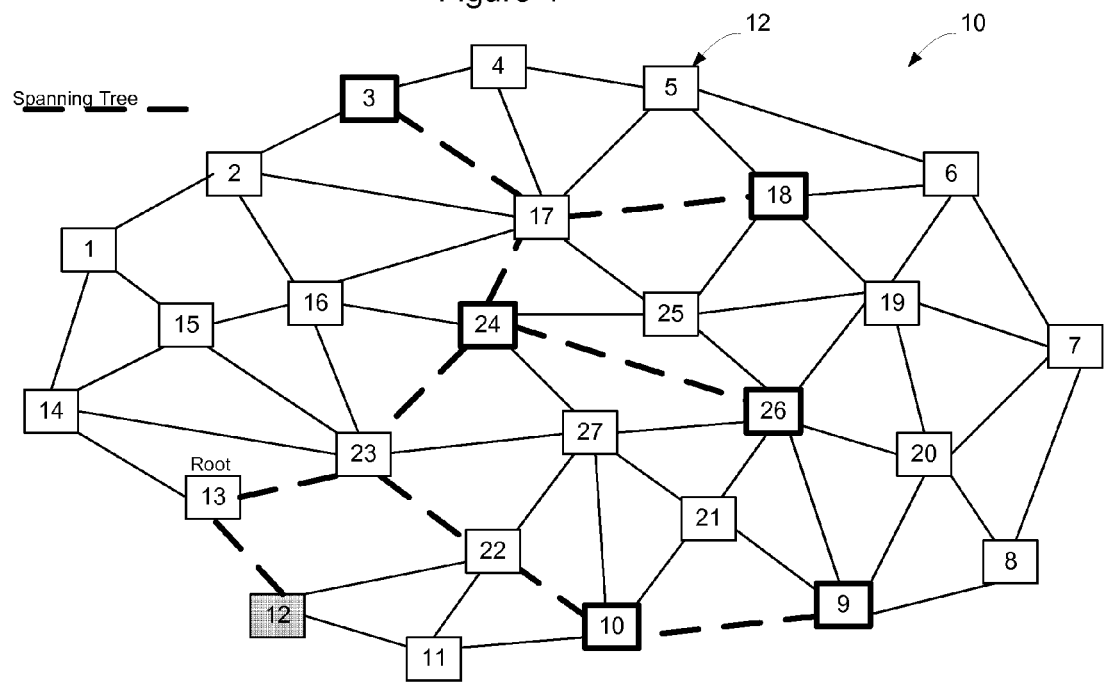

FIGS. 3-4 show an example communication network 10 in which two different source nodes 1, 12 are transmitting multicast data to the same set of destination nodes. In FIGS. 3-4, however, the multicast trees are established using a spanning tree algorithm that has a common root selection algorithm. In this example, the root of the spanning tree has been elected to be node 13. As is clear from these two figures, the use of a spanning tree enables multicast forwarding state to be installed based on multicast destination group alone, rather than based on both source and group as the split horizon forwarding inherent to a spanning tree permits a single multicast address for the group to be shared by all sources for a given service. Stated differently, each node on the spanning tree will need to install forwarding state for (*,G) where * represents any source that wishes to multicast to the group on that multicast tree. In an Ethernet context, each spanning tree, rooted on a specific node and providing connectivity to every other node, can be implemented using a single B-VID. Multiple spanning trees, each rooted on a different node, may be implemented using multiple B-VIDs to give diversity of connectivity patterns. In this embodiment, the need to install unicast forwarding state congruent with each multicast tree determines the need for multiple B-VIDs, otherwise multiple multicast trees with disparately located roots could share a B-VID. Each spanning tree defined by a B-VID may be used to implement many individual multicast groups with congruent unicast forwarding.

There are instances where it would be advantageous to use shortest path trees to multicast data to a set of nodes, and other times where it would be advantageous to use a spanning tree to multicast data to the set of nodes. According to an embodiment of the invention, multicast group membership may be advertised in routing system link state advertisements along with an indication of the algorithm that should be used to calculate the multicast distribution trees. The nodes on the network will use the algorithm specified in the link state advertisement to create the multicast tree template to thereby enable multicast specific tree calculation processes to be used in a routed Ethernet mesh network. In the preferred embodiment, there is a VID-algorithm binding advertised, and there are separate I-SID-VID bindings advertised, which produces an inference chain whereby a number of services (I-SIDs) can be aggregated onto the output of a common tree construction algorithm where each service computes the required subset of the computed tree and determines the required forwarding state to be installed dependent upon the group registration mechanism employed for the tree.

Figure 5:
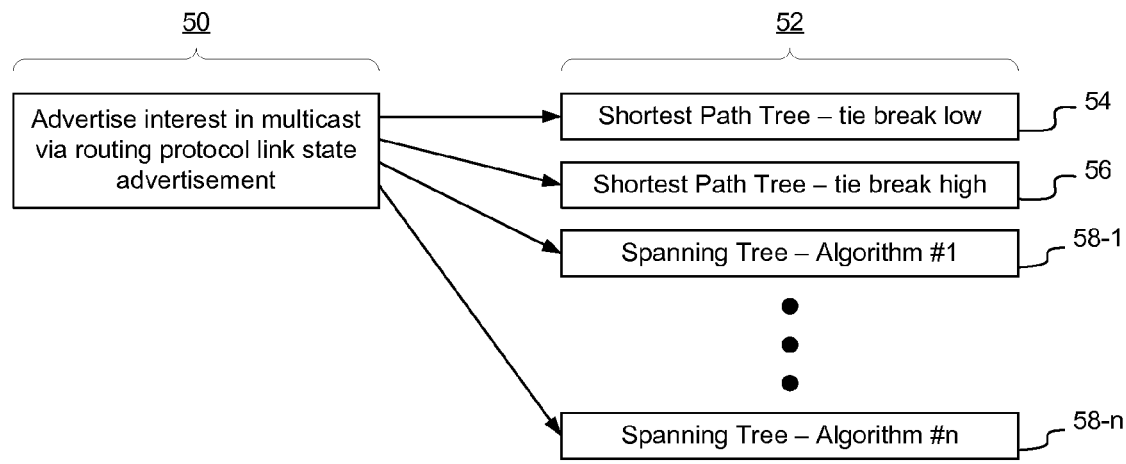
FIG. 5 is a functional block diagram of an example link state advertisement that may be used to convey an algorithm to be used to calculate a multicast tree according to an embodiment of the invention.

FIG. 5 shows an example link state advertisement that may be used to convey an algorithm to be used to calculate a multicast tree. As shown in FIG. 5, when a multicast tree is to be established on the network, any node that would like to be a member of the multicast will advertise interest in the multicast via a routing protocol link state advertisement 50. At least one of the link state advertisements, such as the link state advertisement disseminated by a designated multicast group master, will include an indication of the algorithm to be used to calculate the multicast tree on the network 52.

In one embodiment, a mechanism is required to disseminate and obtain agreement on algorithms. For example, IS-IS hello messages may be used to implement this mechanism. If two adjacent nodes do not agree on algorithm and VID, then that adjacency does not exist in the particular topology associated with the algorithm and VID, while agreement may be reached on both algorithm and VID for other algorithms and hence for other topologies in what is commonly known as a multi-topology network (MTN). Where hello messages or another mechanism is used to agree on the algorithm to be used for multicast tree implementation, and a spanning tree algorithm is used, the root may be established by encoding the root in the hello handshake. This enables system-wide agreement for a given topology. For example, the nodes may agree on the algorithm used to elect the root in IS-IS (i.e. lowest ID or highest ID bridge) and then the nodes may run the algorithm on the topology to figure out which bridge is the root. An implication of this embodiment is that the algorithm/VID binding is provided by a management workstation, and not "auto discovered" from some seed node. Alternatively, the algorithm may include the tree construction technique, a tie breaking technique, and a root selection method.

FIG. 5 shows several possible algorithms that may be used to calculate the multicast tree. In one embodiment, the tie-breaking method documented in U.S. patent application Ser. No. 11/964,478 filed Dec. 26, 2007, entitled "Tie-breaking in Shortest Path Determination," the content of which is hereby incorporated herein by reference, may be used to construct a consistent (S, G) shortest path tree. For example, the link state advertisement may instruct the nodes to calculate the multicast tree using a (S, G) shortest path tree and that the nodes should tie break low 54. Likewise, the link state advertisement may instruct the nodes to calculate the multicast tree using a (S, G) shortest path tree and that the nodes should tie break high 56. Alternatively, the state advertisement may instruct the nodes to calculate the multicast tree using one of a plurality of spanning tree algorithms 58.

In one embodiment, the multicast tree may be a minimum spanning tree. The invention is not intended to be restricted to any particular way of determining a minimum spanning tree. For example, Kiruskal's algorithm [J. B. Kiruskal: On the Shortest Spanning Subtree of a Graph and the Traveling Salesman Problem, in Proceedings of the American Mathematical Society, 7:48-50, 1956], Prim's algorithm [R. C. Prim: Shortest Connection Networks and Some Generalization, Bell Systems Technical Journal, 36:1389-1401, 1957], or any suitable algorithm may be used.

As is the case when multiple equal cost paths exist for shortest path trees, if multiple network links have equal weights when building a minimum spanning tree, care must be taken to tie-break consistently. One approach to guaranteeing that all the network nodes will compute exactly the same minimum spanning tree involves algorithmically modifying each link's weight based on some unique identifier of the network nodes connected by the link, such as, for instance, the nodes' IS-IS system identifiers. A fractional weight may be computed as a symmetric function of the unique node identifiers, such as, for instance, the concatenation of smallest followed by the largest of the two node identifiers (or, equivalently, the largest followed by the smallest). The fractional weight thus constructed may then be added to (or subtracted from) the original integer link weight to produce a set of weights that are all unique. It is a well-known result that, when the weights of the edges of a graph are all different, one, and only one, minimum spanning tree exists for the graph. The function used to modify the link weights may be changed without departing from the scope of the invention, provided that it is symmetric in its two inputs and that it produces different results for different pairs of nodes. Indeed, different such tie-breaking functions may be used advantageously in the same B-VID to build different minimum spanning trees on which the traffic load of different service instances could be spread.

Once the weights have been modified to be unique, any minimum spanning tree algorithm, including ones that only produce correct results if edge weights are all different, such as Borůvka's algorithm [O. Borůvka: Jistem problemu minimalmim, Praca Moravske Prirodovedecke Spolecnosti, 3:37-58, 1926 (in Czech)], can be used to construct the unique minimum spanning tree. Furthermore, because minimum spanning tree algorithms build the tree one link at a time by selecting the link with the lowest weight from a suitable subset, as long as the fractional weights are strictly less than one unit of the original link metric, the unique minimum spanning tree of the modified graph will be a minimum spanning tree of the original graph. This simple approach may be varied without departing from the scope of the invention. For instance, it will be apparent to a skilled artisan that, instead of modifying the edge weights prior to running a minimum spanning tree algorithm, Prim's algorithm, Kruskal's algorithm, or any suitable minimum spanning tree algorithm could be adapted to tie-break on the fly, for example by comparing unique node identifiers, when the algorithm needs to chose between multiple edges with minimal equal weights.

Some spanning tree algorithms require selecting a root node from which to start building the spanning tree and, hence, the particular algorithm to be used must enable the nodes to correctly determine the root node. For example, an algorithmic ranking of nodal nicknames may be used to determine the root node or the designated multicast group master may advertise the root node in the link state advertisement. Other ways of determining the root node may be used as well.

As the link state advertisements are distributed on the network, each node will use the algorithm to calculate the tree for the common multicast distribution tree. The nodes will then selectively install forwarding state if they are on the tree between the source (root) and at least one node advertising interest in a specific multicast group that is mapped to the common tree.

In one embodiment, the nodes may use a process described in U.S. patent application Ser. No. 12/259,650, filed Oct. 28, 2008, entitled "Provider Link State Bridging (PLSB) Computation Method" to determine whether they are on a path between the root node and one or more nodes advertising interest in the multicast. The content of this application is hereby incorporated herein by reference. As described in this application, the node divides the realm of nodes into three groups—those upstream of the root node (which may be ignored), those between itself and the root node, and those downstream of itself. This enables the node to logically partition the network. The node then evaluates nodes on the spanning tree (or shortest path tree) within each partition to identify nodes that have advertised common interest in the multicast. For each such node the node will install forwarding state. This enables the node to accelerate the process of calculating forwarding state for the multicast.

Figure 6:
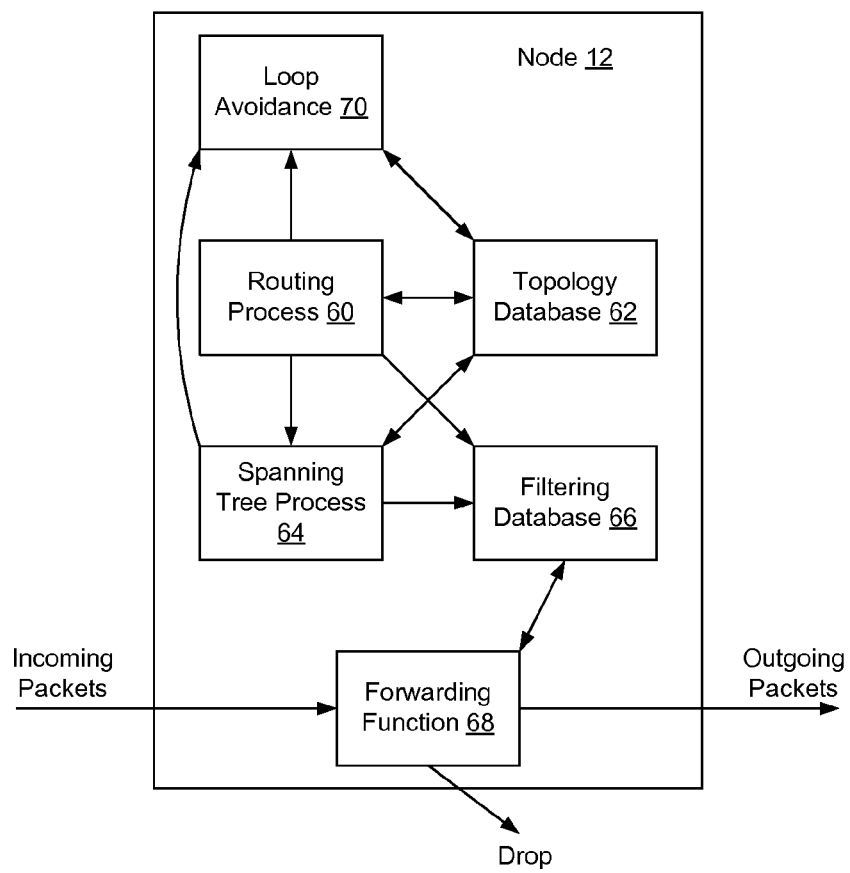
FIG. 6 is a functional block diagram of an example node that may be used to implement a process of specifying a computational algorithm for multicast tree implementation on a routed Ethernet mesh network according to an embodiment of the invention.

FIG. 6 shows an example node 12 that may be used to implement an embodiment of the invention. As shown in FIG. 6, the node includes a routing process 60 that exchanges link state protocol messages with other nodes on the network to build a network topology database 62. The routing process 60 uses the topology maintained in the topology database to calculate shortest path trees through the network. The node 12 also includes a spanning tree process 64 that uses the topology database 62 to calculate spanning trees through the network. When a link state advertisement is received that contains multicast tree information, the routing process 60 will extract the algorithm to be used for creation of the multicast tree and either calculate a shortest path tree for the multicast or pass the link state advertisement to the spanning tree process for calculation of the multicast tree.

Once the tree has been calculated by the node, the node will selectively install forwarding state in its filtering database 66 which may be used by a forwarding function 68 to selectively forward packets on the multicast tree. This takes the form of blocking or unblocking each port of the node for the VID associated with the spanning tree algorithm, and installing filtering state for multicast and unicast addresses. There are several ways in which this may occur:

1) Simply defining the spanning tree with the VID only and using normal bridging procedures, and accepting both flooding and multicast inefficiency (no group registration mechanism).
2) Simply defining the spanning tree with the VID only, and augmenting the filtering with procedures such as Multiple Multicast Registration Protocol (MMRP), to establish using signaling a strict subset of the VID tree required to connect all end-points with interest in a specific multicast group.
3) Specifying the spanning tree by installing VID and multicast filtering information, but still performing unicast flooding to learn the route to unknown MAC addresses.
4) Install all MAC state, both unicast and multicast, as PLSB does whereby IS-IS is the registration mechanism for multicast group interest. Where PLSB is used, other robust mechanisms such as Reverse Path Forwarding Check (RPFC) may be implemented to prevent traffic from looping on the network.

Option 4 provides particular advantages, such as in connection with Operation Administration and Maintenance (OAM), because it guarantees common treatment for a frame with a given address. Thus, there is no ambiguity introduced due to the possibility of a frame with a given address combination being flooded one time and sent unicast the next. Although this option is preferred, the invention is not limited to an embodiment that utilizes this method as the other options may be used as well.

Loop avoidance is very important in a multicast context and, according to an embodiment, the node 12 includes a loop avoidance function 70. The loop avoidance function 70 enables forwarding state to be verified with neighboring nodes before forwarding state is installed for the multicast, to ensure that loops are not inadvertently formed. In one embodiment, the loop avoidance process documented in U.S. patent application Ser. No. 12/260,558 filed Oct. 29, 2008 may be used to implement loop avoidance process 70. The content of this application is hereby incorporated herein by reference.

As documented in this application, when calculating a multicast tree, the node 12 that has determined its distance to the spanning tree root has changed will remove all multicast entries in the downstream direction, and for every leaf for which the distance has changed will remove the multicast entries associated with the leaf. It will then use a handshake procedure to synchronize with its neighbor closer to the root to make sure that that neighbor has also calculated that it is closer to the root before installing new state for the multicast trees in that VID. Likewise, the node will synchronize with its neighbors farther from the root to make sure those neighbors believe that they are farther away from the root before installing state on those respective interfaces. Implementing a handshake process of this nature enables multiple tree calculation algorithms to be used to implement multicast trees while ensuring that the nodes have a synchronized view of the network in a given algorithm prior to installing forwarding state for the multicast trees. The handshake is common to the set of all algorithms as it is an exchange of a digest of the information common to the computation used by all algorithms.

In one embodiment, rather than removing multicast addresses for a given source for which the distance has changed, we remove the unicast address for a given source (both the nodal loopback MACs and port MACs). A spanning tree encodes (S,G) as (source MAC, group multicast MAC) and PLSB (shortest path) encodes both in a source-specific multicast MAC. Thus, removing the source unicast MAC address provides the analogy between spanning tree and shortest path tree. In either instance, the (S,*) is removed from the FDB to prevent loop formation while the multicast tree is calculated and synchronized between neighbors on the network.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing multicast on a routed Ethernet mesh network, the method comprising:

receiving, by a node on the routed Ethernet mesh network, a plurality of link state advertisements each specifying an end-point of a multicast tree to be implemented on the routed Ethernet mesh network, at least one of the link state advertisements further specifying an algorithm being used to calculate the multicast tree;

determining whether there is agreement between the specified algorithm and an algorithm to be used by the node on the routed Ethernet mesh network, and when there is agreement, using the specified algorithm, by the node on the routed Ethernet mesh network, to calculate the multicast tree; and selectively installing forwarding state for the multicast tree if the node on the routed Ethernet mesh network is on the path of the multicast tree between two nodes each advertising an end-point of the multicast tree.

2. The method of claim 1, wherein the algorithm is one of a plurality of possible multicast tree creation algorithms.

3. The method of claim 1, wherein the at least one of the link state advertisements further specifies a VLAN ID associated with the multicast tree to enable multicast trees to be created using different multicast tree creation algorithms on a per VLAN basis.

4. The method of claim 1, wherein the algorithm calculates a shortest path tree.

5. The method of claim 1, wherein the algorithm is a spanning tree algorithm.

6. The method of claim 5, wherein the spanning tree algorithm further specifies a root selection process for the spanning tree.

7. The method of claim 5, wherein the link state advertisement specifies the root for the spanning tree.

8. The method of claim 1, wherein the multicast tree is a minimum spanning tree.

9. The method of claim 8, further comprising calculating the minimum spanning tree by tie-breaking between links of equal weight by using a secondary metric algorithmically derived from unique end-point identifiers.

10. The method of claim 8, further comprising calculating the minimum spanning tree by adjusting link weights on the network where multiple links have equal weights.

11. The method of claim 10, wherein the adjusting the link weights comprises modifying each link's weight based on a unique identifier of network nodes connected by the link.

12. The method of claim 10, wherein the adjusting the link weights comprises calculating a fractional weight for at least one of the links that have equal weights, and either adding or subtracting the fractional weight to the original link weight.

13. The method of claim 12, wherein the fractional weight is strictly less than an integer unit of the original link metric.

14. The method of claim 8, further comprising using a minimum spanning tree algorithm to determine the minimum spanning tree, and using node identifiers during the step of using the minimum spanning tree algorithm to adjust link weights to prevent multiple links from having equal weights.

15. The method of claim 1, further comprising removing forwarding state for the multicast tree upon occurrence of a change in network topology.

16. The method of claim 15, wherein the removing the forwarding state for the multicast tree comprises removing source specific multicast forwarding state for all multicast trees associated with a source that is farther from or closer to the node based on the change in network topology.

17. A computer program product stored on a non-transitory computer readable medium, the computer program product containing data and instructions which, when loaded into one or more processors of a node on a routed Ethernet mesh network, cause the one or more processors to perform a method of implementing multicast on the routed Ethernet mesh network, the method comprising the steps of:

receiving, by the node on the routed Ethernet mesh network, a plurality of link state advertisements each specifying an end-point of a multicast tree to be implemented on the routed Ethernet mesh network, at least one of the link state advertisements further specifying an algorithm being used to calculate the multicast tree;

determining whether there is agreement between the specified algorithm and an algorithm to be used by the node on the routed Ethernet mesh network, and when there is agreement, using the specified algorithm, by the node on the routed Ethernet mesh network, to calculate the multicast tree; and selectively installing forwarding state for the multicast tree if the node on the routed Ethernet mesh network is on the path of the multicast tree between two nodes each advertising an end-point of the multicast tree.

18. The computer program product of claim 17, wherein the algorithm is one of a plurality of possible multicast tree creation algorithms, and wherein the at least one of the link state advertisements further specifies a VLAN ID associated with the multicast tree to enable multicast trees to be created using different multicast tree creation algorithms on a per VLAN basis.

19. The computer program product of claim 17, wherein the multicast tree is a minimum spanning tree, and wherein the method further comprises the step of calculating the minimum spanning tree by adjusting link weights on the network where multiple links have equal weights.

20. The computer program product of claim 19, wherein the step of adjusting link weights comprises modifying each link's weight based on a unique identifier of network nodes connected by the link.

21. The computer program product of claim 20, wherein the step of adjusting link weights comprises calculating a fractional weight for at least one of the links that have equal weights, and either adding or subtracting the fractional weight to the original link weight.

* * * * *